United States Patent
Cannon et al.

(10) Patent No.: US 6,243,459 B1
(45) Date of Patent: Jun. 5, 2001

(54) TELEPHONE WITH ADAPTIVE SPEED DIAL MECHANISM

(75) Inventors: Joseph M. Cannon, Harleysville; Jalil Fadavi-Ardekani, Orefield; James A. Johanson, Emmaus, all of PA (US)

(73) Assignee: Agere Systems Guardian Corp., Miami Lakes, FL (US)

( * ) Notice: Subject to any disclaimer, the term of this patent is extended or adjusted under 35 U.S.C. 154(b) by 0 days.

(21) Appl. No.: 09/009,600

(22) Filed: Jan. 20, 1998

(51) Int. Cl.⁷ .................................................. H01M 1/272
(52) U.S. Cl. ............................................. 379/356; 379/354
(58) Field of Search ................................. 379/356, 201, 379/216, 354, 355, 357

(56) References Cited

U.S. PATENT DOCUMENTS

| | | | |
|---|---|---|---|
| 4,908,853 | * 3/1990 | Matsumoto | 379/355 |
| 4,930,155 | * 5/1990 | Kurokawa | 379/355 |
| 5,222,127 | 3/1992 | Satoshi Fukui . | |
| 5,303,288 | * 4/1994 | Duffy et al. | 455/564 |
| 5,930,350 | * 7/1999 | Johnson | 379/355 |
| 6,005,927 | * 12/1999 | Rahrer et al. | 379/142 |
| 6,009,338 | * 12/1999 | Iwata et al. | 455/575 |
| 6,011,579 | * 1/2000 | Newlin | 348/15 |

FOREIGN PATENT DOCUMENTS

| | | | | |
|---|---|---|---|---|
| 0 477 854 | 4/1992 | (EP) | ............................ | H04M/1/274 |
| 2 331 890 | 6/1992 | (GB) | ............................ | H04M/1/274 |
| 2 292 043 | 2/1996 | (GB) | ............................ | H04M/1/274 |
| 97/19546 | * 5/1997 | (WO) | ............................ | H04M/3/42 |

OTHER PUBLICATIONS

European Standard Search Report –Dated 10/12/2000.

* cited by examiner

Primary Examiner—Wing F. Chan
(74) Attorney, Agent, or Firm—John P. Veschi

(57) ABSTRACT

A telephone adaptively updates its speed dial memory. For example, the telephone updates the speed dial memory based on a calling history. An example of a calling history based update according to the invention is to add frequently called telephone numbers to the speed dial memory and to drop infrequently called telephone numbers from the speed dial memory. Another example is to order the telephone numbers in the speed dial memory based on the frequency with which they are called.

15 Claims, 3 Drawing Sheets

FIG. 2

| | SPEED DIAL UPDATING UNIT | 109 |
|---|---|---|
| 302 / 202 | | |
| 304 / 204 | | |
| 306 / 206 | | |
| 308 / 208 | | |
| 310 / 210 | 86 | (410) 267 - 8172 |
| 312 / 212 | 65 | (201) 280 - 1308 |
| 314 / 214 | | |
| 316 / 216 | | |
| 318 / 218 | | |
| 320 / 220 | | |
| 322 / 222 | | |
| 324 / 224 | | |
| 326 / 226 | | |
| 328 / 228 | | |
| 330 / 230 | | |
| 350 / 250 | | |

113   111

TELEPHONE WITH ADAPTIVE SPEED DIAL MECHANISM

FIELD OF THE INVENTION

The invention is directed to the field of telephony, and in more particular to a feature incorporated into a telephone.

BACKGROUND OF THE INVENTION

A telephone is conventionally "dialed" by a calling party pressing a series of keys on the telephone. Each key suppression is sensed by telephone circuitry, and converted into a corresponding electrical signal, such as a dual tone multi-frequency (DTMF) signal. A public switched telephone network (PSTN), or other central switching system, interprets these DTMF signals, and routes the call appropriately.

As a time saving feature, many telephones incorporate "speed dial" buttons. A typical telephone incorporating this feature has on the order of 10 speed dial buttons. Each speed dial button is programmed by the user to correspond to a particular telephone number. When a programmed speed dial button is pressed by the user, the telephone circuitry creates a series of DTMF signals corresponding to the programmed telephone number, and transmits these DTMF signals to the PSTN. Thus, from the perspective of the PSTN, it appears as if the user pressed the keys corresponding to the programmed telephone number, when the user in fact merely pressed the speed dial button.

As an alternative, some telephones incorporate speed dial functionality without providing separate speed dial buttons for each programmed number. An example of such a telephone is one that has a memory button that works in conjunction with the numeric buttons on the telephone keypad. For example, a user of such a telephone presses "memory" "3" in order to call the telephone number programmed for the third memory location, and the telephone circuitry acts to produce the corresponding DTMF signals.

A drawback of each type of conventional speed dial telephone is that the user must take the time to initially program the speed dial numbers into the speed dial memory. Another drawback is that the user must take additional time to reprogram the speed dial numbers in the speed dial memory when circumstances change. For example, if a user has her mother's telephone number programmed into the memory location corresponding to the first speed dial button, such that pressing the first speed dial button results in an outgoing call to the user's mother, then the user must reprogram this memory location if her mother's telephone number changes, such as when her mother moves or when her mother's area code changes. If the user does not reprogram the memory location, then suppression of her mother's speed dial button will no longer result in a telephone call to her mother.

A drawback related to the time and effort needed to program and reprogram speed dial numbers is that many users effectively elect not to use this feature. Such users either never make the effort to initially program the speed dial memory when first acquiring the telephone, or make an initial programming effort, but never update the programming when circumstances change, thereby leaving the speed dial memory in a perpetual out of date state.

SUMMARY OF THE INVENTION

According to the invention, a telephone adaptively updates its speed dial memory. For example, the telephone updates the speed dial memory based on a calling history. An example of a calling history based update according to the invention is to add frequently called telephone numbers to the speed dial memory and to drop infrequently called telephone numbers from the speed dial memory. Another example is to order the telephone numbers in the speed dial memory based on the frequency with which they are called. Still another example is to keep the most recently called telephone numbers in a portion of the speed dial memory, preferably ordered based on call frequency. Yet another example is to keep the most recent incoming telephone numbers in speed dial memory, preferably based on call frequency.

BRIEF DESCRIPTION OF THE DRAWING

FIG. 2 is a simplified diagram of a portion of the speed dial updating unit of the embodiment of FIG. 1.

DETAILED DESCRIPTION

Figure 1:
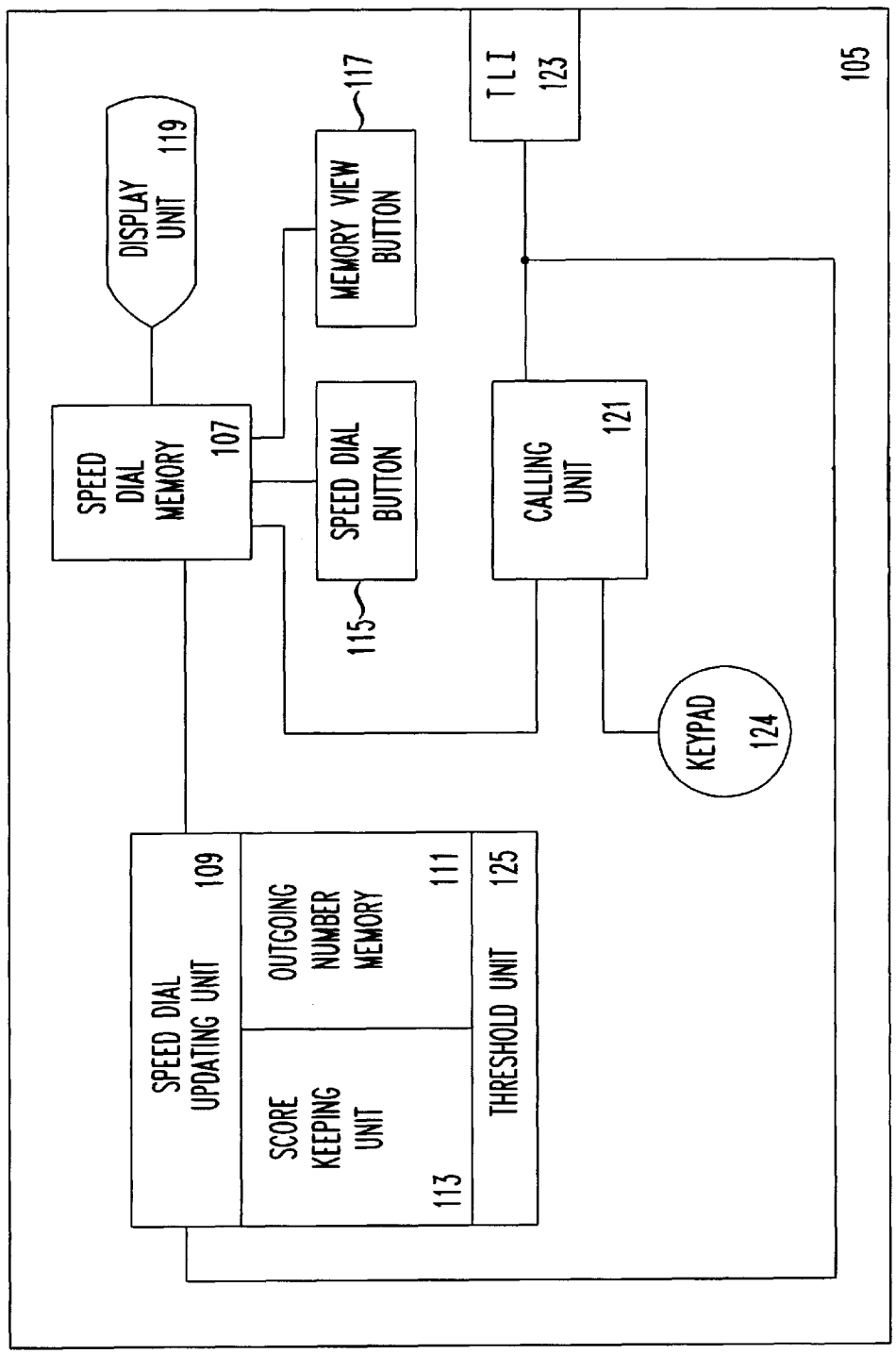
FIG. 1 is a simplified block diagram of one embodiment of a telephone according to the invention.

Telephone 105, shown in FIG. 1, includes a speed dial memory 107 and a speed dial updating unit 109. The speed dial memory 107 stores at least one speed dial number. According to the invention, the content of the speed dial memory 107 is updated based on a calling history determined by the speed dial updating unit 109.

For example, speed dial updating unit 109 includes an outgoing number memory 111 and a score keeping unit 113. The outgoing number memory 111 stores the telephone numbers of outgoing calls, and the score keeping unit 113 keeps a count of the quantity of calls placed to each outgoing number. The size of outgoing number memory 111 is limited only by the physical memory space allotted thereto. In theory, sufficient memory space can be allotted to store hundreds of outgoing telephone numbers, effectively maintaining a record of every telephone number called by a typical user of telephone 105. In practice, however, a memory size sufficient to store on the order of fifty or one hundred telephone numbers should be sufficient.

Score keeping unit 113 maintains a count of the number of outgoing calls placed to each number stored in outgoing number memory 111. FIG. 2 is a simplified diagram of a portion of speed dial updating unit 109, including a portion of outgoing number memory 111 and a portion of score keeping unit 113. Outgoing number memory 111 includes a plurality of memory cells 202, 204, 206 . . . 250, and score keeping unit 113 includes a corresponding plurality of memory cells 302, 304, 306 . . . 350. Each memory cell in the outgoing number memory 111 is adapted to store an outgoing telephone number, and each memory cell in the score keeping unit 113 is adapted to store a value, such as a count of the number of times an outgoing call was placed to a corresponding outgoing telephone number stored in a cell of outgoing number memory 111.

For example, cell 210 of outgoing number memory 111 stores telephone number (410) 267-8172, and cell 310 of score keeping unit 113 stores the number 86, indicating that 86 outgoing telephone calls have been placed to the number (410) 267-8172. Similarly, cell 212 stores telephone number (201) 280-1308, and corresponding cell 312 stores the quantity 65.

When an outgoing telephone call is placed, speed dial updating unit 109 receives the telephone number of the outgoing call and compares it to the telephone numbers stored in outgoing number memory 111. If there is a match, speed dial updating unit 109 increments the corresponding count. For example, if a new outgoing call is placed to the number (201) 280-1308, speed dial updating unit 109 determines that this number matches the number stored in cell 212, and causes the count in cell 312 to increment to 66. If, on the other hand, an outgoing call is placed to a new telephone number, such that there is not a match, the new telephone number is stored in an empty cell of outgoing number memory 111, and a count of 1 is stored in a corresponding cell of score keeping unit 113.

Speed dial memory 107 contains at least one speed dial number. In one embodiment according to the invention, speed dial memory 107 contains one speed dial number for each speed dial button appearing on an instrument panel of the telephone. In an alternative embodiment according to the invention, speed dial memory 107 contains a plurality of speed dial numbers associated with only one, or a small number of, speed dial buttons appearing on the instrument panel. In either embodiment, speed dial updating unit 109 updates the speed dial memory 107 based, for example, on the count stored in score keeping unit 113.

The updating process can be periodic. For example, speed dial updating unit 109 can update speed dial memory 107 once each day, once each week, once each month, etc. Alternatively, the updating process can occur after a fixed number of outgoing calls. For example, speed dial updating unit 109 can update speed dial memory 107 after each call, after every ten calls, after every fifty calls, etc. The updating process can be user selectable or programmable, and preferably occurs only when there is a change in status.

In the embodiment shown in FIG. 1, telephone 105 includes a speed dial button 115 and a memory view button 117 each coupled to speed dial memory 107. Speed dial memory 107 is also coupled to display unit 119. According to this embodiment, when a user activates memory view button 117, a speed dial number from speed dial memory 107 is displayed on display unit 119. For example, a plurality of telephone numbers can be stored in speed dial memory 107, and user activation of memory view button 117 can cause one, all, or a subset of the numbers stored in speed dial memory 107 to be displayed on display unit 119.

In one exemplary embodiment, user activation of memory view button 117 causes the numbers in speed dial memory 107 to be displayed in a meaningful sequence, such as in an order beginning with the most frequently called number. For example, when a user first activates memory view button 117, the most frequently called number can be displayed on display unit 119. A second activation of memory view button 117 will cause the second most frequently called number to be displayed on display unit 119, while a third activation will cause the third most frequently called number to be displayed, and so on. In this way, a user can step through the speed dial numbers beginning with the most frequently dialed number and working down towards less frequently dialed numbers. According to this embodiment, when the desired telephone number is displayed, the user can activate speed dial button 115 to initiate a call to the desired telephone number.

Display unit 119 may display additional information along with the displayed telephone number. For example, display unit 119 may display the name of the party associated with the telephone number, may display the time/date of the most recent call to the telephone number, may provide an indication of the number of calls placed to the telephone number within a given period of time, may provide an indication of the number of calls received from the telephone number within the given period of time, etc. Of course, for display unit 119 to display this additional information, display unit 119 must receive this information, either from speed dial memory 107, or from a supplemental memory that stores this information.

This supplemental information is intended to assist the user of telephone 105 to identify the telephone number to which the user wants to place a call. For example, presume that the user wants to call a party, and the party is someone the user calls fairly frequently so that the party's telephone number is in speed dial memory 107. The user can then activate memory view button 117 until the party's telephone number appears on display unit 119. If the user remembers that the user last called the party on Saturday night, then as the user steps through the displayed telephone numbers, the user can look at displayed data regarding the most recent time the telephone number was called, in addition to looking at the displayed telephone numbers, in order to identify the correct telephone number.

When the correct telephone number is displayed on display unit 119, the user activates speed dial button 115. This causes speed dial memory 107 to output the telephone number to a calling unit 121, which is coupled to the PSTN or other network via a telephone line interface (TLI) 123. The calling unit 121 thus places an outgoing call to the identified number. Calling unit 121 is also coupled to keypad 124 to receive outgoing call information based on user activation of keypad 124. Thus, calling unit 121 can place an outgoing call either based on user input of the telephone number, or based on receipt of a telephone number from speed dial memory 107. In addition to placing the outgoing call, the calling unit also provides the outgoing call information to speed dial updating unit 109. Thus, speed dial updating unit 109 can update the outgoing number memory 111 and/or the score keeping unit 113.

Speed dial updating unit 109 may also include a threshold unit 125. Threshold unit 125 stores one or more thresholds used by speed dial updating unit 109 in managing the content of outgoing number memory 11 and score keeping unit 113. An example of a threshold stored in threshold unit 125 and used by speed dial updating unit 125 is a time threshold. Based on such a threshold, speed dial updating unit 109 can periodically adjust the values in score keeping unit 113 to reflect only calls placed within the specified time period. For example, if the time threshold is set to thirty days, speed dial updating unit 109 will adjust the values in score keeping unit 113 to reflect only those calls placed in the last thirty days. This updating can be periodic, such as once per day, and can occur when telephone 105 is on hook and otherwise unengaged.

For example, presume that three of the 86 calls to telephone number (410) 267-8172, and two of the 65 calls to (201) 280-1308 were placed during the day thirty days previous to the present day. At a set time tomorrow, such as after midnight when tomorrow begins, speed dial updating unit 109 will adjust the value in memory cell 310 to be 83, and will adjust the value in memory cell 312 to be 63. By periodically updating the values based on the threshold, the telephone numbers stored in speed dial memory 107 will be the telephone numbers to which the most outgoing calls have been placed within a recent period of time set by the threshold. Thus, without any affirmative programming step by the user, the speed dial memory remains current.

Another advantage of updating the outgoing number memory 111 and the score keeping unit 113 based on a threshold is that this process frees up memory space for use by new numbers. Thus, if a number has not been called within the past thirty days, the related memory cell of outgoing number memory 111 is erased or marked for overwriting by a new telephone number. Similarly, the corresponding cell of score keeping unit 113 is erased or marked for overwriting. In this way, the size of the memory space allotted for outgoing number memory 111 and score keeping unit 113 can be kept smaller, since all outgoing telephone numbers will not be stored therein.

A potential disadvantage of using a time based threshold is that telephone numbers will continue to age even during periods of telephone inactivity, such as during a vacation period. For example, if the user of telephone 105 goes on a one month vacation, and thus does not use telephone 105 at all during the one month period, the entire speed dial updating unit 109, and thus the speed dial memory 107, may be wiped clean. To prevent this from happening, the threshold can be based on usage days instead of calendar days. For example, the threshold can be such that all numbers called within the last thirty days that telephone 105 was used will be maintained. Thus, if telephone 105 is used intermittently, the calendar time associated with the threshold can adapt based on the usage.

Another alternative that avoids the problem of accidentally wiping the memories clean is to set the threshold based on a quantity of outgoing telephone calls. For example, the threshold can be set to 500 calls, and can be set to cause an update every 10 calls. According to this scenario, after every tenth call, speed dial updating unit 109 adjusts the values stored in outgoing number memory 111 and score keeping unit 113 to reflect only those calls that were placed within the last 500 calls. It is also possible, of course, that the threshold can be both time and quantity based, such as a threshold of all calls within the last 500 calls that were placed within the last thirty usage days.

Another alternative threshold is based on amount of call time. For example, if a first telephone number is called twice, and each call lasts ten minutes, then the first telephone number has twenty minutes of call time. A second telephone number that is called four times, with each call lasting one minute, yielding four minutes of call time, may thus be evaluated as having less call time than the first telephone number.

Regardless of the thresholding scheme, when speed dial updating unit 109 updates the information in outgoing number memory 111 and score keeping unit 113, it then updates speed dial memory 107 to contain the telephone numbers associated with the highest corresponding values in score keeping unit 113. It is also possible, of course, for the telephone 105 to allow user programmability in a traditional sense, whereby a user programs in a telephone number to be part of the speed dial system. Thus, for example, the invention can allow for one or more telephone numbers to be part of speed dial memory 107 no matter how often they are called, and for all other telephone numbers in speed dial memory 107 to be adaptively set and updated according to the invention.

Figure 3:
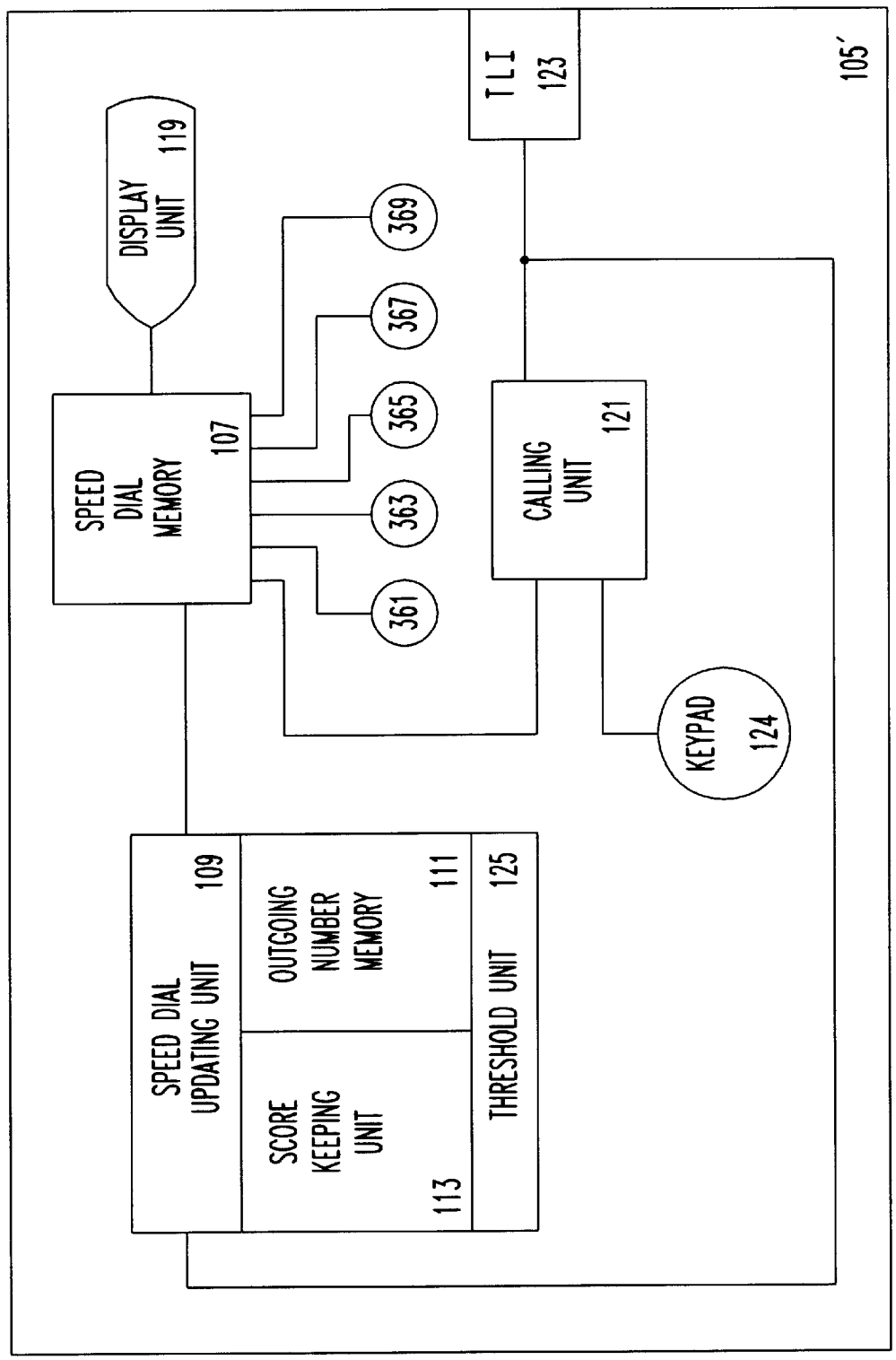
FIG. 3 is a simplified block diagram of an alternative embodiment of a telephone according to the invention.

FIG. 3 is a simplified block diagram of telephone 105' according to an alternative embodiment according to the invention. Speed dial updating unit 109, outgoing number memory 111, score keeping unit 113, calling unit 121, telephone line interface 123 and keypad 124 operate in like manner to their functionality as described above with respect to telephone 105. In telephone 105', however, a plurality of speed dial buttons, such as five speed dial buttons 361, 363, 365, 367 and 369 are provided.

The use of five speed dial buttons is purely by way of example, and not of limitation. Any number of speed dial buttons may be provided.

Each of the speed dial buttons 361–369 is associated with a telephone number stored in speed dial memory 107. According to one embodiment, display unit 119 displays each of the speed dial numbers, associating them with their corresponding speed dial buttons, so that the user can simply look at the display to determine the proper button to activate. According to this example, when the user activates one of the speed dial buttons, speed dial memory 107 causes the corresponding telephone number to be sent to calling unit 121, and calling unit 121 initiates the outgoing call and informs speed dial updating unit 109 of the outgoing telephone number.

With as few as five speed dial buttons, it may be practical for display unit 119 to continuously display all of the speed dial numbers (or to display them discontinuously, such as by entering a power saving mode and then displaying all five speed dial numbers upon a wakeup, such as upon user activation of telephone 105', such as by lifting up a receiver and causing a switchhook transition), however, it may be impractical to continuously or discontinuously display a greater quantity of speed dial numbers, such as twenty speed dial numbers associated with a telephone 105' having 20 speed dial buttons. In such an example, speed dial memory 107 can be adapted to cause display unit 119 to display a speed dial number associated with a speed dial button upon a user's first activation of the speed dial button, and to initiate an outgoing call via calling unit 121 upon a user's second activation of the speed dial button.

Thus, for example, a user can activate the first speed dial button to cause display unit 119 to display the corresponding speed dial number (and any other information associated therewith for which display unit 119 is configured). If this is not the desired telephone number, the user can activate the second speed dial button, causing display unit 119 to display the corresponding speed dial number. If this is the correct telephone number, the user can again activate the second speed dial button to cause an outgoing call to be placed to the displayed telephone number.

This embodiment can be extended to enable the user to fixedly program some or all of the speed dial buttons. For example, a user can program speed dial buttons 1–10 with numbers corresponding to the user's friends and family, but can allow speed dial buttons 11–20 to be adaptively set and updated. The grouping of programmed speed dial buttons in one group (1–10), and adaptive speed dial buttons in a second group (11–20) is purely by way of example and not of limitation. Any configuration of speed dial buttons is possible according to the invention.

The aforementioned embodiments are based on outgoing calls. In each of the embodiments the speed dial memory 107, outgoing number memory 111, and score keeping unit 113 are adapted to be updated based on outgoing calls. It is also possible to have the speed dial updating unit keep track of incoming calls, such that score keeping unit 113 maintains data reflective of the incoming calls along with or in place of the outgoing calls. For example, score keeping unit 113 can keep track of information such as the number of calls received from a telephone number, the amount of call time for such calls, time and date of last received call, and any call related information, such as Caller ID data, associated with such calls. This information can be thresholded in a manner similar to that described above with respect to the outgoing calls. Further, if a call is received from a telephone number stored in outgoing number memory 111, Caller ID data associated with the incoming call can be associated with the telephone number so that display unit 119 can display the Caller ID data when it displays the telephone number.

Caller ID data can also be provided by a central office or private branch exchange (PBX) to which telephone 105 or 105' is coupled. For example, a field in speed dial updating unit 109, or in an associated memory, can store Caller ID data received from the PBX or central office in conjunction with the storage of a telephone number in outgoing number memory 111. The central office can be further configured to provide a service to an incoming caller whereby the central office provides call history data to the incoming caller. Examples of call history data include the most recently called telephone number(s), an ordering of most frequently called telephone numbers, based, for example, on calls placed since a threshold time or within a threshold number of calls, an ordering of incoming call sources, based, for example, on frequency, etc. This call history data may, of course, include Caller ID data or other call related data associating a party name or other information with a telephone number.

The speed dial memory 107, speed dial updating unit 109 and calling unit 121 may be realized jointly or separately as integrated circuits, for example as part of a processor, such as a digital signal processor. Such a processor may be a special purpose processor configured solely to carry out the functions described herein, or may be a processor configured to carry out conventional telephone call handling functions in addition to the inventive functions described herein.

What is claimed is:

1. A telephone, comprising:

a speed dial memory; and a speed dial updating unit adapted to automatically update the speed dial memory based on calling history;

wherein the speed dial updating unit includes an outgoing telephone number memory adapted to store outgoing telephone numbers associated with outgoing calls, and a score keeping unit adapted to maintain a count of the number of calls to each outgoing telephone number;

wherein the speed dial updating unit includes a threshold unit adapted to set a threshold, such that the score keeping unit maintains a count of the number of calls since the threshold for each outgoing telephone number; and wherein the threshold is based on at least one of a measure of time and a number of calls.

2. A telephone as recited in claim 1, wherein the threshold is based on both a measure of time and a count of a number of calls.

3. A telephone as recited in claim 1, wherein the speed dial updating unit updates the speed dial memory based on the count of the score keeping unit.

4. A telephone as recited in claim 1, further comprising a speed dial actuating element, wherein the speed dial memory has a memory location corresponding to the speed dial actuating element, and wherein the speed dial updating unit is adapted to update the memory location based on the calling history.

5. A telephone as recited in claim 4, wherein the speed dial actuating element is a button.

6. A telephone as recited in claim 4, further comprising a calling unit adapted to initiate an outgoing call to a telephone number stored in the memory location based on activation of the speed dial button.

7. A telephone as recited in claim 4, wherein the speed dial actuating element is a voice recognition unit adapted to translate a voice recognition signal into a stored telephone number.

8. A telephone as recited in claim 7, further comprising a display unit adapted to display the telephone number stored in the memory location.

9. A telephone as recited in claim 8, wherein the display unit is adapted to associate the displayed telephone number with the speed dial button.

10. A telephone as recited in claim 9, further comprising a plurality of speed dial buttons, wherein the display unit is adapted to display a plurality of telephone numbers and associate the displayed telephone numbers with corresponding speed dial buttons.

11. A telephone as recited in claim 9, wherein the speed dial memory has a plurality of memory locations each adapted to store a corresponding telephone number, the telephone further comprising a memory view button, wherein the display unit is adapted to display the telephone numbers stored in the memory locations in a meaningful order based on activation of the memory view button.

12. A telephone as recited in claim 11, further comprising a calling unit adapted to initiate an outgoing call to a telephone number stored in the speed dial memory based on activation of the speed dial button.

13. A telephone as recited in claim 12, wherein the meaningful order is a series order based on frequency of calling, such that the display unit is adapted to display the telephone numbers beginning with the most frequently called telephone number, and wherein the calling unit is adapted to call the displayed telephone number based on activation of the speed dial button.

14. A method of configuring a speed dial memory, comprising the steps of:

storing a plurality of speed dial numbers; and automatically updating the stored plurality of speed dial numbers based upon a call history;

further comprising the step of ordering the stored speed dial numbers based on a criterion;

wherein the criterion includes at least one of the number of calls placed to each stored speed dial number within a predetermined period of time, the number of calls received from each stored speed dial number within a predetermined period of time, the number of calls placed to each stored speed dial number within a predetermined total number of outgoing calls, the amount of call time for calls placed to each stored speed dial number, and the number of calls received from each stored speed dial number within a predetermined total number of incoming calls.

15. A method as recited in claim 14, further comprising the step of associating each of the stored speed dial numbers with a corresponding speed dial button.

\* \* \* \* \*